United States Patent
Gura et al.

(10) Patent No.: US 11,615,394 B2
(45) Date of Patent: *Mar. 28, 2023

(54) SEQUENTIAL SELECTION PRESENTATION

(71) Applicant: eBay Inc., San Jose, CA (US)

(72) Inventors: Ron Gura, Tel-Aviv (IL); Matanya Bar, Tel-Aviv (IL); Erez Dickman, Tel-Aviv (IL)

(73) Assignee: eBay Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/141,115

(22) Filed: Jan. 4, 2021

(65) Prior Publication Data
US 2021/0125167 A1    Apr. 29, 2021

Related U.S. Application Data

(63) Continuation of application No. 16/696,681, filed on Nov. 26, 2019, now Pat. No. 10,929,831, which is a
(Continued)

(51) Int. Cl.
| | | |
|---|---|---|
| G06F 3/048 | (2013.01) | |
| G06Q 20/32 | (2012.01) | |
| G06Q 20/12 | (2012.01) | |
| G06Q 30/06 | (2023.01) | |
| G06Q 30/0601 | (2023.01) | |

(Continued)

(52) U.S. Cl.
CPC ......... G06Q 20/322 (2013.01); G06F 3/0488 (2013.01); G06F 3/04817 (2013.01); G06Q 20/12 (2013.01); G06Q 30/06 (2013.01); G06Q 30/0641 (2013.01)

(58) Field of Classification Search
CPC .................................................. G06F 3/04817
See application file for complete search history.

(56) References Cited

U.S. PATENT DOCUMENTS 5,365,154 A * 11/1994 Schneider ............ H05B 47/185
                                                             307/115
5,548,832 A *  8/1996 Karam ................... H04B 1/401
                                                             455/343.1

(Continued)

FOREIGN PATENT DOCUMENTS

WO        2014/193614 A1    12/2014

OTHER PUBLICATIONS

Ruan et al., Touch Interact: An Interaction Technique with Large Displays Using Touchscreen-phone. 2010, IEEE, 4 pages.*
(Continued)

*Primary Examiner* — Linh K Pham
(74) *Attorney, Agent, or Firm* — FIG. 1 Patents

(57) ABSTRACT

Sequential selections are presented by receiving an input on an active portion of a display of the computing device. While the input is received, a plurality of selections are sequentially displayed on the display. An indication is received that the input on the active portion of the display of the computing device has changed. In response to receiving the indication that the input has changed, the computing device stops presenting the plurality of selections and determines which selection of the plurality of selections was presented on the display when the input changed. The determined selection is then displayed.

20 Claims, 4 Drawing Sheets

Related U.S. Application Data continuation of application No. 16/027,089, filed on Jul. 3, 2018, now Pat. No. 10,558,968, which is a continuation of application No. 14/084,317, filed on Nov. 19, 2013, now Pat. No. 10,043,172.

(60) Provisional application No. 61/828,567, filed on May 29, 2013.

(51) Int. Cl.
*G06F 3/04817* (2022.01)
*G06F 3/0488* (2022.01)

(56) References Cited

U.S. PATENT DOCUMENTS

| | | | | |
|---|---|---|---|---|
| 6,380,696 | B1* | 4/2002 | Sembhi | H05B 39/086 |
| | | | | 315/DIG. 4 |
| 7,080,394 | B2 | 7/2006 | Istvan et al. | |
| 7,693,753 | B1 | 4/2010 | Purdy | |
| 8,127,254 | B2* | 2/2012 | Lindberg | G06F 3/0488 |
| | | | | 715/863 |
| 8,136,724 | B1 | 3/2012 | Aidasani et al. | |
| 8,544,429 | B2 | 10/2013 | Nakamura et al. | |
| 8,544,729 | B2 | 10/2013 | Aidasani et al. | |
| 8,988,356 | B2* | 3/2015 | Tseng | G06F 3/04883 |
| | | | | 345/172 |
| 9,113,504 | B1* | 8/2015 | Hamasaki | B60Q 1/14 |
| 9,280,249 | B2* | 3/2016 | Kondoh | G06F 3/0488 |
| 10,043,172 | B2 | 8/2018 | Gura et al. | |
| 10,558,968 | B2 | 2/2020 | Gura et al. | |
| 10,929,831 | B2 | 2/2021 | Gura et al. | |
| 2004/0125128 | A1 | 7/2004 | Chang et al. | |
| 2005/0009498 | A1* | 1/2005 | Ho | H04L 12/282 |
| | | | | 455/435.1 |
| 2009/0066534 | A1* | 3/2009 | Sivakkolundhu | H04L 12/2818 |
| | | | | 340/4.32 |
| 2010/0115402 | A1* | 5/2010 | Knaven | G06F 3/0237 |
| | | | | 715/261 |
| 2010/0145861 | A1 | 6/2010 | Law et al. | |
| 2010/0162105 | A1* | 6/2010 | Beebe | G06Q 10/1093 |
| | | | | 705/7.18 |
| 2010/0259500 | A1* | 10/2010 | Kennedy | G06F 3/0414 |
| | | | | 345/173 |
| 2010/0332351 | A1 | 12/2010 | Stone | |
| 2011/0016390 | A1 | 1/2011 | Oh et al. | |
| 2011/0167382 | A1* | 7/2011 | van Os | G06Q 10/109 |
| | | | | 715/810 |
| 2011/0282785 | A1 | 11/2011 | Chin | |
| 2012/0124512 | A1* | 5/2012 | Lindberg | G06F 3/04817 |
| | | | | 715/781 |
| 2012/0174121 | A1* | 7/2012 | Treat | G06F 9/542 |
| | | | | 719/318 |
| 2012/0226983 | A1 | 9/2012 | Goldenberg et al. | |
| 2012/0254808 | A1 | 10/2012 | Gildfind | |
| 2012/0317023 | A1 | 12/2012 | Moon et al. | |
| 2013/0007653 | A1* | 1/2013 | Stolyarov | G06F 3/04845 |
| | | | | 345/173 |
| 2013/0019174 | A1* | 1/2013 | Gil | G06F 3/0481 |
| | | | | 715/711 |
| 2013/0050263 | A1* | 2/2013 | Khoe | G06F 3/04883 |
| | | | | 345/634 |
| 2013/0052946 | A1* | 2/2013 | Chatterjee | H04W 4/80 |
| | | | | 455/41.1 |
| 2013/0068832 | A1* | 3/2013 | Li | H04L 12/282 |
| | | | | 235/375 |
| 2013/0227480 | A1* | 8/2013 | Kim | G06F 3/0482 |
| | | | | 715/810 |
| 2013/0249861 | A1* | 9/2013 | Chang | G06F 3/017 |
| | | | | 345/174 |
| 2014/0007008 | A1 | 1/2014 | Baca et al. | |
| 2014/0007019 | A1* | 1/2014 | Saukko | G06F 3/0484 |
| | | | | 715/863 |
| 2014/0019910 | A1* | 1/2014 | Kim | G06F 3/0486 |
| | | | | 715/810 |
| 2014/0358782 | A1 | 12/2014 | Gura et al. | |
| 2014/0380234 | A1* | 12/2014 | Shim | G06F 3/0488 |
| | | | | 715/781 |
| 2015/0020032 | A1* | 1/2015 | Chen | G06F 3/04812 |
| | | | | 715/857 |
| 2017/0164448 | A1* | 6/2017 | Jones | H05B 47/105 |
| 2017/0228148 | A1* | 8/2017 | Liu | G06F 3/04883 |
| 2018/0315037 | A1 | 11/2018 | Gura et al. | |
| 2019/0068393 | A1* | 2/2019 | Lee | H04L 67/36 |
| 2020/0097944 | A1 | 3/2020 | Gura et al. | |
| 2021/0329768 | A1* | 10/2021 | Johnson | H05B 45/46 |

OTHER PUBLICATIONS

Advisory Action received for U.S. Appl. No. 14/084,317 dated Mar. 28, 2017, 3 pages.
Final Office Action received for U.S. Appl. No. 14/084,317, dated Jan. 13, 2017, 7 pages.
Final Office Action received for U.S. Appl. No. 14/084,317, dated Mar. 21, 2016, 11 pages.
Non-Final Office Action received for U.S. Appl. No. 14/084,317, dated Oct. 3, 2016, 9 pages.
Non-Final Office Action received for U.S. Appl. No. 14/084,317, dated Sep. 6, 2017, 8 pages.
Non-Final Office Action received for U.S. Appl. No. 14/084,317, dated Sep. 28, 2015, 9 pages.
Notice of Allowance received for U.S. Appl. No. 14/084,317, dated Mar. 26, 2018, Mar. 26, 2018, 9 pages.
Communication pursuant to Rules 94(3) EPC received for European Patent Application No. 14804869.7, dated Jan. 25, 2018, 5 pages.
Extended European Search Report received for European Patent Application No. 14804869.7, dated Sep. 30, 2016, 9 pages.
Summons to Attend Oral Proceedings received for European Patent Application No. 14804869.7 mailed on Jul. 29, 2019, 12 pages.
Corrected Notice of Allowability received for U.S. Appl. No. 16/027,089, dated Nov. 6, 2019, 7 pages.
Corrected Notice of Allowability Received for U.S. Appl. No. 16/027,089, dated Jan. 8, 2020, 3 pages.
Notice of Allowance received for U.S. Appl. No. 16/027,089, dated Sep. 5, 2019, 10 pages.
International Preliminary Report on Patentability received for PCT Patent Application No. PCT/US2014/036978, dated Dec. 10, 2015, 7 pages.
International Search Report received for PCT Application No. PCT/US2014/036978, dated Sep. 19, 2014, 2 pages.
International Written Opinion received for PCT Application No. PCT/US2014/036978 dated Sep. 19, 2014, 5 pages.
First Examination Report received for Australian Patent Application No. 2014272139, dated Aug. 5, 2016, 3 pages.
Notice of Allowance received for Australian Patent Application No. 2014272139, dated Mar. 3, 2017, 3 pages.
Office Action received for Canadian Patent Application No. 2,912,759, dated Dec. 12, 2016, 3 pages.
Notice of Allowance received for Canadian Patent Application No. 2912759 , dated Dec. 1, 2017, 1 page.
EPO Written Decision to Refuse Received for European Patent Application No. 14804869.7, dated Mar. 17, 2020, 33 pages.
Non-Final Office Action Received for U.S. Appl. No. 16/696,681, dated Oct. 2, 2020, 6 pages.
Notice of Allowance received for U.S. Appl. No. 16/696,681, dated Dec. 11, 2020, 4 pages.
Notice of Allowance received for U.S. Appl. No. 16/696,681, dated Oct. 30, 2020, 7 pages.
14804869.7 , "Summons to Attend Oral Proceeding Received for European Patent Application No. 14804869.7, mailed on Mar. 10, 2022", Mar. 10, 2022, 3 Pages.

* cited by examiner

SEQUENTIAL SELECTION PRESENTATION

CLAIM OF PRIORITY

This application is a continuation of and claims priority to U.S. patent application Ser. No. 16/696,681, filed Nov. 26, 2019, which claims priority under 35 U.S.C. § 120 to U.S. patent application Ser. No. 16/027,089, filed Jul. 3, 2018, which claims priority under 35 U.S.C. § 120 to U.S. patent application Ser. No. 14/084,317, filed Nov. 19, 2013, which claims priority under 35 U.S.C. § 120 to U.S. Provisional Application Ser. No. 61/828,567, filed on May 29, 2013, the disclosures of which are incorporated by reference herein.

BACKGROUND

Mobile devices are being used more often for shopping and purchasing or payments. However, due to various characteristics of a mobile device, such as small screen size and device movement, it may be difficult for the user to proceed with a shopping or payment flow. For example, the user may inadvertently tap or select an unintended button to cause a payment or action that is not desired. This can happen due to the small screen size, resulting in smaller buttons or links in close proximity to each other and/or the user or device moving, such as the user walking or in a bus, when the user selects a button on the device, resulting in an erroneous selection.

It is desirable enable a user to more easily and accurately conduct a transaction on a mobile device without the disadvantages of conventional methods.

DETAILED DESCRIPTION

Figure 1:
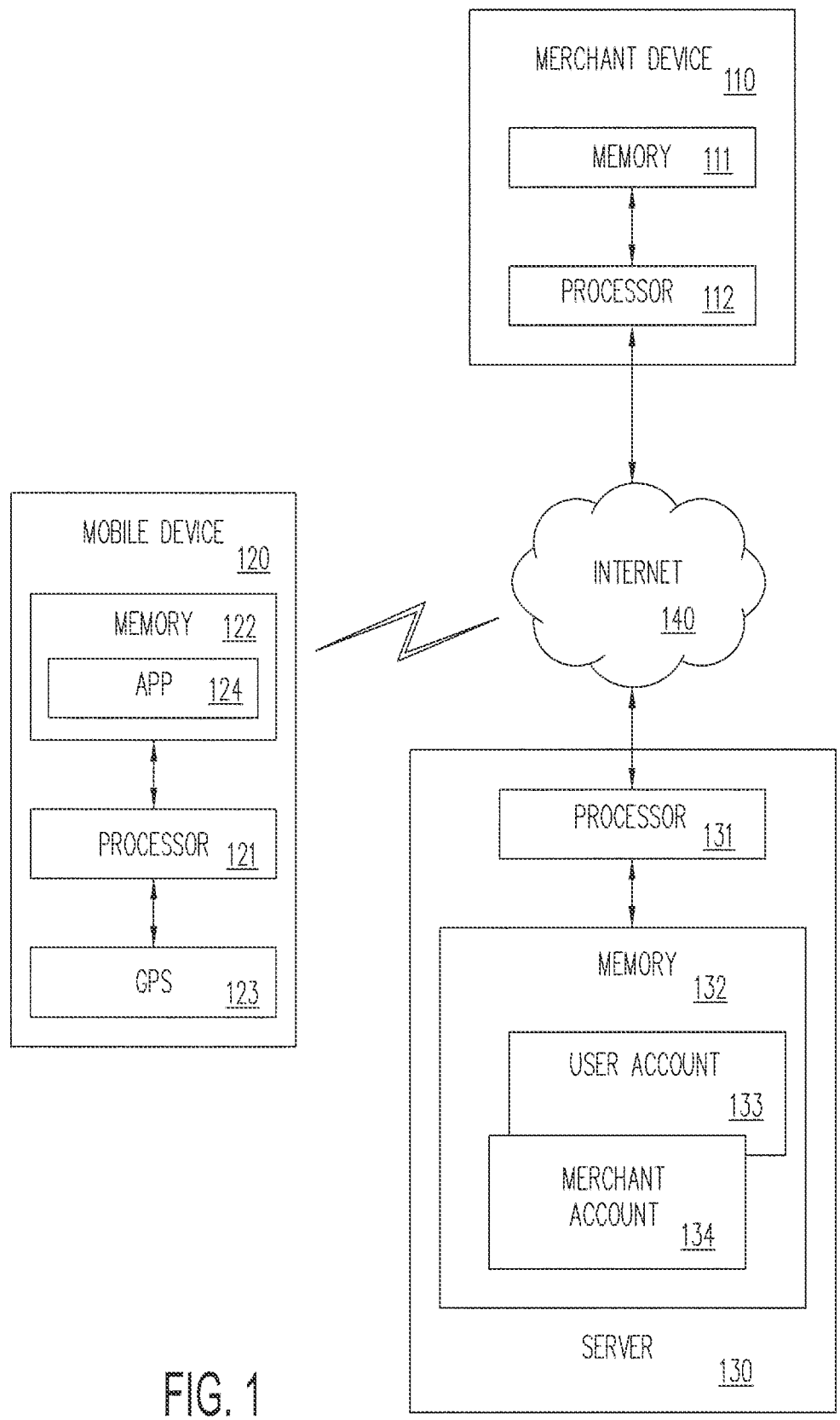
FIG. 1 is a block diagram of a networked system suitable for implementing the processes described herein according to an embodiment.

According to an embodiment, when a user taps and holds a selection such as a "buy" button or other suitable link or button, an action occurs. Subsequently, when the user releases the button (or performs some other action), another action initiates or occurs. The other action may depend on when the user releases the button, information about the user, and/or the display or information on the device when the button is released.

After the button is released, other selections or actions may be presented on the touchscreen sequentially such that the user can release the hold to choose the selection. The selections can be presently sequentially on the screen in the manner of a slide show, for example. Thus, when the user sees the desired selection on the touchscreen, the user can release the hold (lift the finger that performed the tap) from the touchscreen to choose the selection. Choosing the selection can result in another selection being presented to the user such that the tap and hold process can be repeated or can result in any other action.

In another embodiment, the other selections or actions may be presented on the touchscreen substantially simultaneously, such that the user can drag the hold to choose the desired selection. Thus, when the user sees the desired selection on the touchscreen, the user can drag the hold (slide the finger that performed the tap) to the position of the desired selection or action on touchscreen. Lifting the finger can select or initiate the selection or action after the drag. The selection or action may also be initiated by leaving the finger on the selected item (such as for a predetermined amount of time) after the drag or movement.

In one embodiment, once the user holds a "buy it now" button, a timer shows up counting down from, e.g., 5 seconds, and the screen also sequentially displays to the user default buying information, such as price, shipping address, and funding source. The user then releases the button when desired information is displayed (such as information that the user wants to verify or change), at the expiration of the timer, or when all of the default 30 buying information has been displayed such that the purchase may be completed. The user may be asked to confirm, such as by performing a specific gesture on the device or performing a specific action on the device, such as tapping a specific portion of the display. This prevents inadvertent purchasing by someone just holding the display.

An action may also be initiated or a screen displayed based on the current content of the screen when the user releases the button or selection. As discussed above, the selections can be presented substantially sequentially according to an embodiment. That is, a plurality of selections can be presented on a series of different screens while the user holds the tap. For example, when the user taps and holds the "buy it now" button of a merchant web site, a series of sequentially presented items, images, or selections can be displayed for the user to confirm or change. The series of sequentially presented selections can include, for example, the item or items being purchased, the total price, the quantity, the billing address, the shipping address, the shipping method, and the payment method. As each of these selections is sequentially presented, the user can release the hold to choose one of the selections. The user can then more carefully review the information associate with that selection, confirm the information, or change the information.

For example, when the shipping method is being displayed, the user can release the hold. The information on shipping method remains on the screen (i.e., the content that was displayed when the user releases the hold stays on the screen). The user can then review the shipping method, change the shipping method, or confirm the shipping method. Once confirmed or changed, the process or sequential display may begin again. In one embodiment, this starts where the process was paused or halted, e.g., in this example, the next display will be what normally would be displayed after the shipping method content. In another embodiment, the process starts at the beginning.

As discussed above, the selections can be presented substantially simultaneously according to an embodiment. That is, a plurality of selections can be presented on a single screen while the user holds the tap. For example, when the user taps and holds the "buy it now" button of a merchant website, a plurality of simultaneously presented items or selections can be displayed for the user to confirm or change. The plurality of simultaneously presented selections can include, for example, the item or items being purchased, the total price, the quantity purchased, the billing address, the shipping address, the shipping method, and the payment method. While each of these selections is simultaneously presented, the user can drag or slide the hold to the desired selection on the touchscreen and then release the hold to choose one of the selections. The user can then more carefully review the item, confirm the item, or change the selected item.

For example, the user can drag the hold to the shipping method on the touchscreen and can then release the hold. The user can then review the shipping method, change the shipping method, or confirm the shipping method.

The user can release the hold by lifting the holding finger, moving the holding finger (such as by sliding the holding finger), tapping and/or holding another item, pushing a button, making a gesture, speaking a command, or by any other method. Releasing the hold can provide yet another selection. The tap, hold, drag, and/or release process can repeat as needed to complete or terminate the process.

Various, more complex, user input methods may also be performed. That is, user input can perform several actions that accomplish several results. The actions can be continuous and/or discreet. For example, a first selection can be made by performing a first tap and hold, another selection can be made by sliding the first hold and releasing the first hold, yet another selection can be made by performing a second tap and hold (such as by tapping and holding another item while releasing the first hold—with the same or a different finger), yet another selection can be made by pushing a button while releasing the second hold, yet another selection can be made by making a gesture while releasing the second hold (with the same or a different hand), and yet another selection can be made by speaking a command while releasing the second hold. Thus, various actions can be combined (sequentially and/or simultaneously) to select various items. In this manner, a plurality of items can quickly and easily be selected, and any number of items can be selected.

According to an embodiment, the user can release the button before the timer expires, the action ends, or the user is taken to a screen where the user can change the information that was just displayed, such as shipping address, funding source, etc. The timer or process can then resume from approximately the point in the user interaction process that was in progress when the user released the button or when the timer expired, such that the user does not need to see the previous information and wait on the process.

In another embodiment, at each or some of the information displays, the user can drag the screen to change the information displayed. Dragging can pause the timer, which can then resume upon revision of the information. Alternatively, the timer can continue while dragging occurs.

The context of the holding and/or releasing can be specific to the user and/or the page. Thus, when one user is logged onto and/or using the device, one set of tapping and holding parameters or predetermined instructions can be used and when another user is logged onto and/or using the device another set of tapping and holding parameters or predetermined instructions can be used. The device can determine the identity of the user via the login or authentication process or via biometrics such as voice recognition, face recognition, fingerprint recognition, gesture recognition, and/or the like. The parameters or instructions can depend upon characteristics of the user, such as purchase history, activity history with the service or payment provider, age of the user account with the payment provider, gender, age of the user, time, location, browsing history, and the like.

According to various embodiments, a tap and/or hold action can be implemented in various ways to accomplish different results. For example, the tap can be a traditional tap where the user contacts a touchscreen with a finger, typically a fingertip, a shake, displacement, acceleration, orientation, roll, pitch, yaw, or movement of the user device. The tap can be pushing a button, sliding a finger on a touchscreen, or other suitable means of input that enables a selection to be detected. Multiple fingers can perform multiple taps substantially simultaneously. The tap can be any user action that can provide a signal to the user device. Similarly, the hold can be any user action that can provide a signal to the user device that the tapped selection is being held or not released.

In other embodiments, a tap and hold process can produce an off-the-device screen result. The result can be a physical result in the user's environment or in any other environment. For example, the tap can turn on a light and the hold can determine the brightness of the light. The longer that the tap is held, the brighter the light can become.

As a further example, the tap can turn on a television and the hold can set the channel and/or the volume (or any other parameter). A plurality of substantially sequential and/or substantially simultaneous holds can be used. For example, the tap can turn on the television and a first hold can set the channel, then a subsequent second hold can set the volume. The first and second hold can be substantially sequential or can be substantially simultaneous (such as by tapping with two fingers and dragging the two fingers by amounts that provide the desired channel and volume).

The user can perform a series of touchscreen operations to make a selection or make multiple selections using a tap and hold. For example, the user can use tap and hold as 5 follows:

User makes a selection by tapping a touchscreen of a device.
User holds finger in the tapped position.
Additional selections are provided to the user.
When and/or where a desired selection is provided, the user releases the tap.
The selection is accepted by the device.

A device, such as a user's mobile device, can facilitate making a selection or make multiple selections using tap and hold. For example, the device can operate during a tap and hold procedure as follows:

A set of instructions or parameters for tapping and holding can be stored in one or more memories.
When a tap and hold is processed, e.g., received, by one or more processors, the instructions can be accessed from the one or more memories.
A response to the tap and hold can be provided per the accessed instruction and the response can include a change in a screen display of the device.
The process can be repeated until completed or terminated.

According to an embodiment, a computer program product can comprise a non-transitory computer readable medium. The non-transitory computer readable medium can have computer readable and executable code for instructing one or more processors to perform any of the methods disclosed herein.

FIG. 1 is a block diagram of a tap and hold system, according to an embodiment. The system can include a merchant device 110, a mobile device 120, and/or a server 130. The server 130 can be a payment server, an online merchant server, or any other server. The components and functions discussed herein can be split and/or shared among the merchant device 110, the mobile device 120, and/or the payment server 130, as desired.

The merchant device 110 can comprise a merchant checkout terminal, a computer, and/or a server, for example. The merchant device 110 can include a memory 111 and a processor 112. The merchant device 110 can be used for processing purchases from the merchant. The memory 111 and a processor 112 can facilitate the tap and hold. For example, the tap and hold can be performed on a touchscreen of the merchant device. As a further example, the tap and hold can be performed on the mobile device 120 and can be processed, at least partially, on the merchant device 110.

The mobile device 120 can be carried by the user. The mobile device 120 can comprise a cellular telephone, a smart telephone, a hand held computer, a laptop computer, a notebook computer, or a tablet computer, for example. The mobile device 120 can include a processor 121, a memory 122, and a global positioning system (GPS) 123.

The mobile device 120 can be used for routine telephone calls, text messaging, web browsing, and the like. The mobile device 120 can be used for performing the tap and hold. An app 124 can be stored in the memory 122 and executed by the processor 121. The app 124 can be used for facilitating the tap and hold. The memory 122 and the processor 121 can facilitate the tap and hold.

The GPS can vary parameters and or operation of the tap and hold. For example, when the user is in one country, one set of selections can be provided to the user during a tap and hold and when the user is in another country, a different set of selections can be provided to the user. Thus, the selection can be location or country dependent. For example, the selection can relate to currency, stores, restaurants, road routes, train schedules, airline schedules, events (such as sporting events, movies, plays, and concerts), or any other desired items.

Similarly, time (such as time of day and/or calendar date) can vary parameters and or operation of the tap and hold. For example, at a restaurant a breakfast menu can be provided in the morning. The user can tap and hold eggs and can then be presented with a submenu via which the user can indicate how the user wants the eggs cooked.

The server 130 can comprise a server of a payment provider, such as Paypal, Inc. The server 130 can be a single server or can be a plurality of servers. The server 130 can include one or more processors 131 and a memory 132. The memory 132 can be a memory of the server 130 or a memory that is associated with the server 130. The memory 132 can 30 be a distributed memory. The memory 132 can store a user account 133 and a merchant account 134.

The server 130 can be used to facilitate tap and hold. The one or more memories 132 and the one or more processors 121 can facilitate the tap and hold. The tap and hold can be performed on the mobile device 120 and can be processed, at least partially, on the server 130.

Generally, the merchant device 110, the mobile device 120, and the payment server 130 can perform functions discussed herein. That is, at least to some extent, a function that is discussed herein as being performed via one of these devices can be performed by a different one of these devices, by a combination of these devices, and/or by other devices.

The merchant device 110, the mobile device 120, the other mobile devices 130, and the server 130 can communicate with one another via a network, such as the Internet 140. The merchant device 110, the mobile device 120, the other mobile devices 130, and the server 130 can communicate with one another via one or more networks, such as local area networks (LANs), wide area networks (WANs), cellular telephone networks, and the like. The merchant device 110, the mobile device 120, the other mobile devices 130, the social network 150, and the server 130 can communicate with one another, at least partially, via one or more near field communications (NFC) methods or other short range communications methods, such as infrared (IR), Bluetooth, WiFi, and WiMax.

FIG. 1 illustrates an exemplary embodiment of a network-based system for implementing one or more processes described herein. As shown, the network-based system may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or another suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Figure 2:
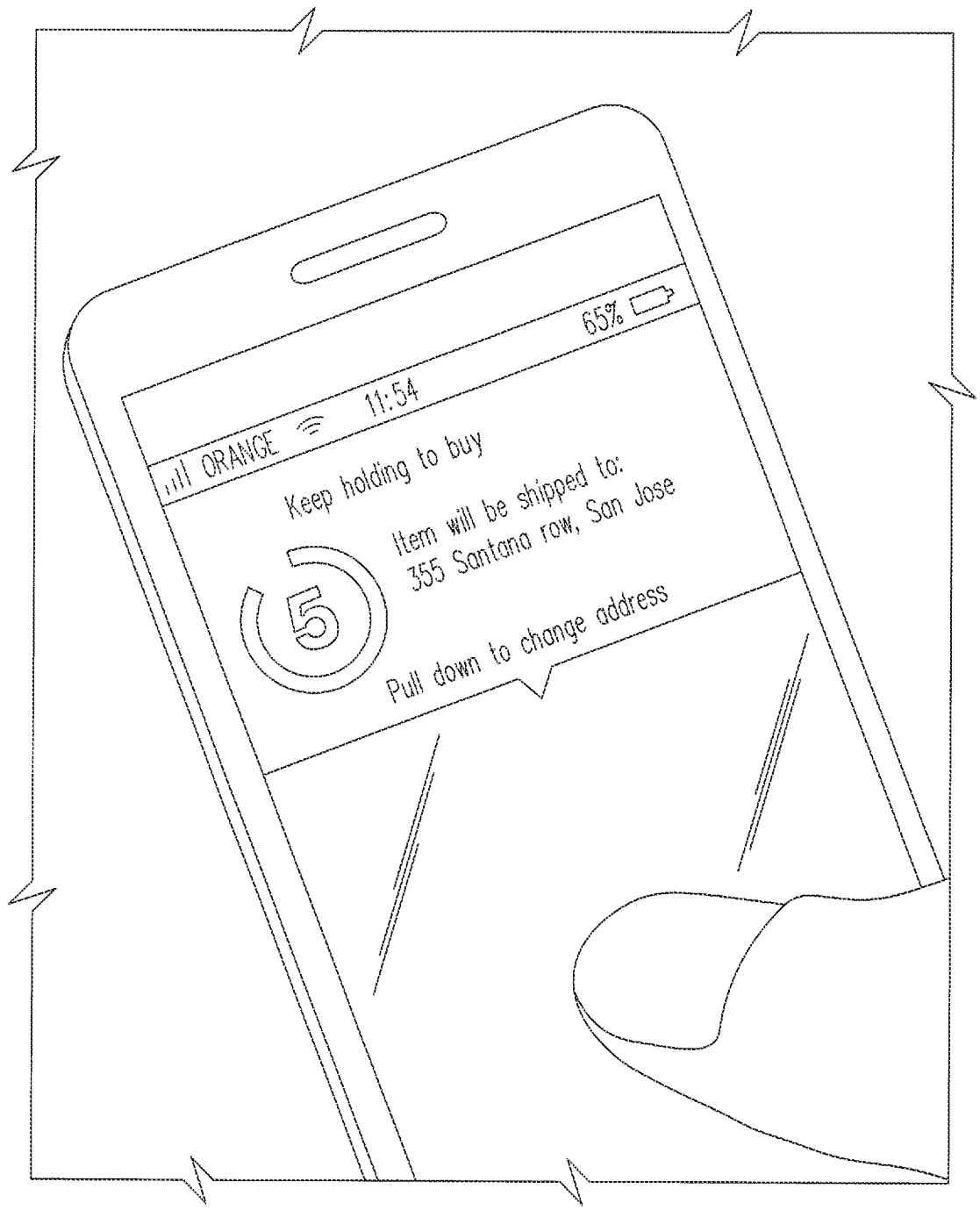
FIG. 2 shows a user tapping and holding a selection on a smart phone, according to an embodiment.

FIG. 2 shows a user performing a tap and hold with a finger of the user, according to one embodiment. The finger of the user has made a selection on the touchscreen of a smart phone to make a purchase. The user is holding the finger down against the touchscreen, which starts a timer. The timer continues as long as the user keeps the finger on the touchscreen. The position on the touchscreen may need to be a specific location or anywhere that the user's finger can be detected. The user sees shipping address information during the countdown, which is the default shipping address associated with the user account. If the user wishes to change the shipping address, the user may pull or slide down the display, which may display fields (not shown) where the user can manually change the address. Once the address is changed, the user may select a button to resume the countdown.

As described above, the user may hold the finger against the touchscreen to see a series of selections or content on the display. The particular selections provided can depend upon when the user tapped the screen, where the user tapped the screen (such as on a buy button from a checkout page), and/or how the user tapped the screen (how hard, how many finger, etc.). When the user sees a desired selection, the user can lift the finger to release the hold and thereby make the desired selection. The user can drag the finger to make the selection or can perform any other action, as discussed herein.

Thus, the user can slide or drag the finger, such as to an icon, to make the selection and/or perform a sequence of actions to define a plurality of desired results. For example, after a desired amount of hold time, a timer appears that counts down and shows various details of the purchase. As shown, with five seconds left, shipping information is shown. When shipping information is being displayed, the user can drag the finger across an icon that indicates "change shipping method," drag down a specified portion of the display, and/or drag across an icon that indicates "change shipping address." In this manner, the user can substantially simultaneously indicate that the user want to change both the shipping method and the shipping address. In response to this action by the user, the user can be present with opportunities to change the shipping method and the shipping address. The user can drag the finger across any desired number of such selections. Thus, one or more selections can be made generally simultaneously (e.g., from a single screen display). If the shipping address is changed, the user may be returned to the timer at the five second mark, instead of at the beginning. For example, at the start of the time, the user may have been shown the funding source, the item description, etc.

In dragging, the user can draw a shape that accomplishes a desired action. For example, the user can drag the tap in a manner that generally defines a triangle. Each corner of the triangle can be at a different selection. Thus, by drawing the triangle, as opposed to a square for example, the user can make three desired selections. Thus, the user can learn to drawing particular shape in order to obtain particular results.

The one or more memories and/or the one or more processors can be one or more memories and/or the one or more processors of the merchant device, 110, the user device 120, the server 130, the social network 150, and/or any other device or system. Memories and/or processors from any number of devices, systems, and entities can cooperate to perform the tap and hold methods disclosed herein.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Payment processing can be through known methods, such as transaction details being communicated to the payment provider through the app, the payment provider processing the details, which may include user account and identifier information and authentication, merchant information, and transaction details. The user account may be accessed to determine if any restrictions or limitations may prevent the transaction from being approved. If approved, the payment provider may send a notification to the merchant and/or the user.

Figure 3:
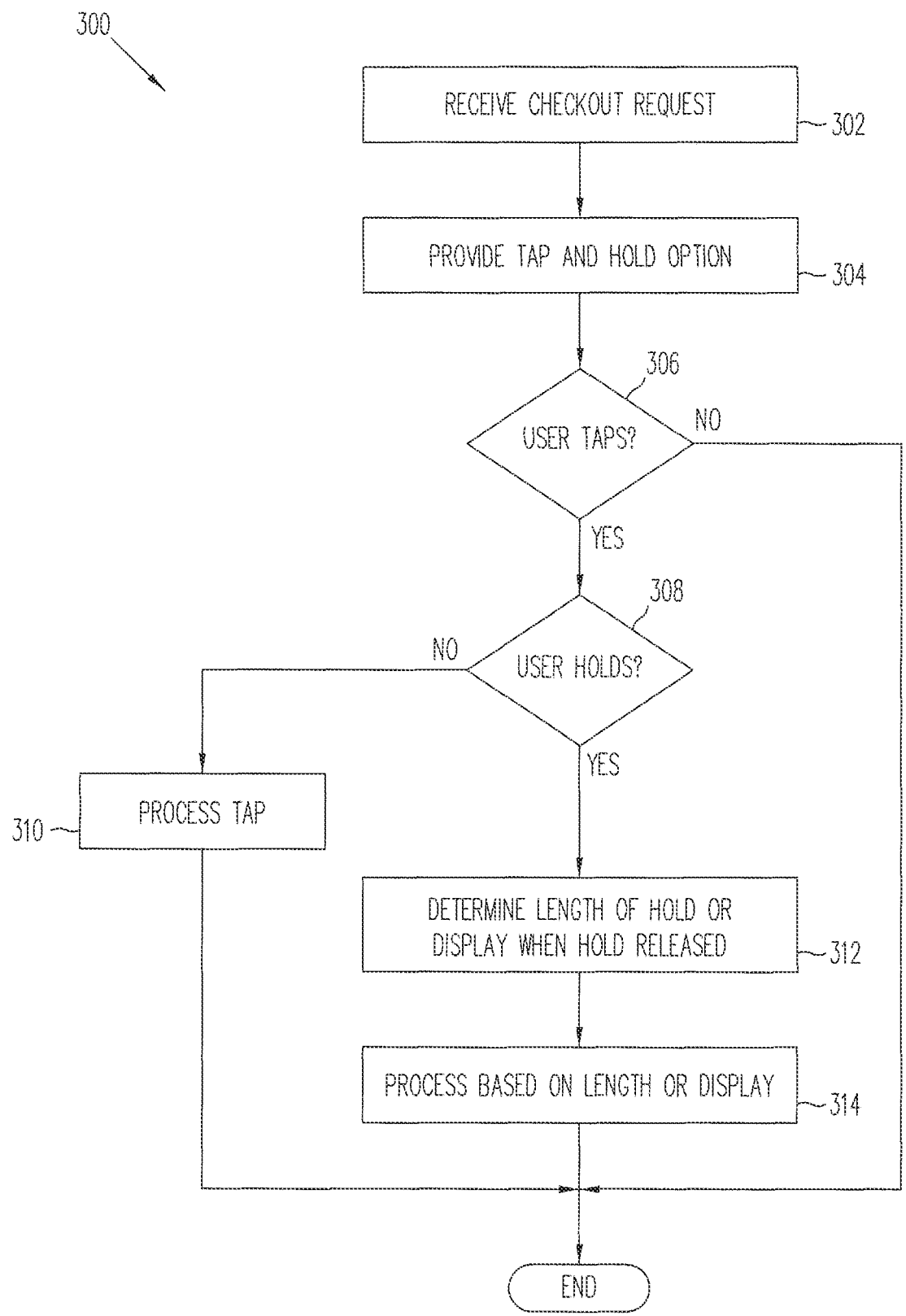
FIG. 3 is a flowchart of a tap and hold process according to one embodiment.

FIG. 3 is a flowchart showing a process 300 for performing a tap and hold transaction according to one embodiment. At step 302, a payment or service provider, such as PayPal Inc. of San Jose, Calif., receives a checkout request. The checkout request may be received by a server of the payment provider from a user device, such as a smart phone, PC, computing tablet, smart watch (or other wearable computing device), etc., when the user is ready to make a payment. For example, the user may be shopping through a merchant app or web page, has finished selecting item(s)/service(s) for payment, such as by putting them into a digital shopping cart, and selecting a checkout/pay button or link. The checkout request includes information about the transaction, such as amount, merchant/seller, user/buyer, item description(s), shipping address, etc. Note that user information may be communicated separately, such as during a login or authentication process, which may be performed before, during, or after the checkout request. User information enables the payment provider to access a user account with the payment provider and allow the user to make a payment from the user account through services provided by the payment provider.

Next, at step 304, a tap and hold option is provided to the user. The user may be presented with instructions or a button that tells the user to select and hold to process the checkout request or to process the payment. For example, the user may be instructed to tap and hold the same button, a different button, a specific location on the device screen, or anywhere on the device screen. The option may also provide details, such as for the user to hold the button for 5 seconds (or some other time), information will be displayed while holding the button and can be changed or viewed when the user releases the button, information will be displayed while holding the button and can be changed when the user drags the user's finger to a desired content being displayed, etc. In one embodiment, the tap and hold payment option may be the same button as the checkout request button, such that the user is presented with this option on the checkout page.

If the user decides to proceed with the tap and hold process, the user taps a specific portion of the display (on a touchscreen device), which communicates a signal or information to the payment provider through the user device. A determination, at step 306, is thus made as to whether the user tapped a portion of the display. If no tap or selection is detected, the process ends. In one embodiment, the tap can occur any time the user is on a checkout screen or screen having a tap and hold option. In another embodiment, the payment provider only waits for a predetermined amount of time, and if no tap is detected, the process ends.

If however, a tap is detected at step 306, the payment provider next determines, at step 308, whether the user is holding the tap or selection. The determination may be through a signal sent from the user device to the payment provider, e.g., a continuous signal indicates the tap is being held, while a cessation of the signal may indicate the user has released the tap, such as in a typical touchscreen process where the user simply taps a desired button or link and does not hold that button or link for any period of time.

In that case, the tap or selection is processed at step 310. This processing may be conventional processing that occurs after a user has tapped or selected a button or link. For example, if the user taps on a "pay" button, the user may be presented with an option to confirm or a message that the payment has been confirmed.

However, if the payment provider determines, at step 308, that the user is holding or has held the button or expected portion on the display, a determination is then made, at step 312, as to the details associated with the hold. In one embodiment, the details include how long the user maintains the hold, which can be determined based on the length of a continuous signal or other means. As discussed above, if the user maintains the hold for the expected amount of time, the action associated with the tap and hold may be completed, such as payment. If the user does not hold for an instructed amount of time, the intended process may be halted or paused, such as for the user to review content or make changes in information presented (e.g., shipping address, etc.). In that case, the content on the display when the user releases the hold may be determined to enable the payment provider to determine the next action(s) to perform, some of which are described herein.

Next, at step 314, based, in part, on the length of the hold and/or the content of the display when the hold was released, the payment provider processes the tap and hold action. For example, if the user holds for the requisite amount of time, a payment to the merchant may be confirmed without further user action. In another embodiment, the user is asked to confirm the payment before it is processed. Confirmation may be through a specific gesture on the device or with the device, such as tapping on a specific button or portion of the device, performing a specific gesture on the device, or performing a specific action with the device, such as a shake. Requiring confirmation after the hold period is over helps prevent inadvertent payment, which may be possible if the user unintentionally leaves a finger pressed against an active region of the device.

In another embodiment, if the user has not maintained the hold for the required amount of time, processing may be based on the content of the screen when the user released the hold or a location on the display where the user released the hold (such as when the user moves the finger to another portion of the screen). For example, various types of information may be shown sequentially, such as shipping address, payment method, etc., and the user releases the hold when the payment method display is shown. Because the payment method display was shown, the payment provider next presents the user with a static screen that enables the user to review and revise the payment method if desired, e.g., enter a new funding instrument. Once entered and/or confirmed, the user may be returned to the tap and hold process, where the user is asked to tap and hold an indicated portion of the display to continue the process.

In another example, the user moves the user's finger to another portion of screen (equivalent to a release since it stops the current processing) before a timer has expired. Here, the processing will depend on where the user moved the finger to on the display. For example, if the display shows shipping address on a top portion of the display and payment method on a bottom portion of the display, and the user moves the finger to the payment method before the timer expires, the payment provider may present the user with a static display of the current selected or default payment source. The display may have fields the user can edit or revise to use a new funding source if desired. Once entered and/or confirmed, the user may be returned to the tap and hold process, where the user is asked to tap and hold an indicated portion of the display to continue the process.

Note that one or more steps described herein may be omitted, combined, or performed in a different sequence.

Figure 4:
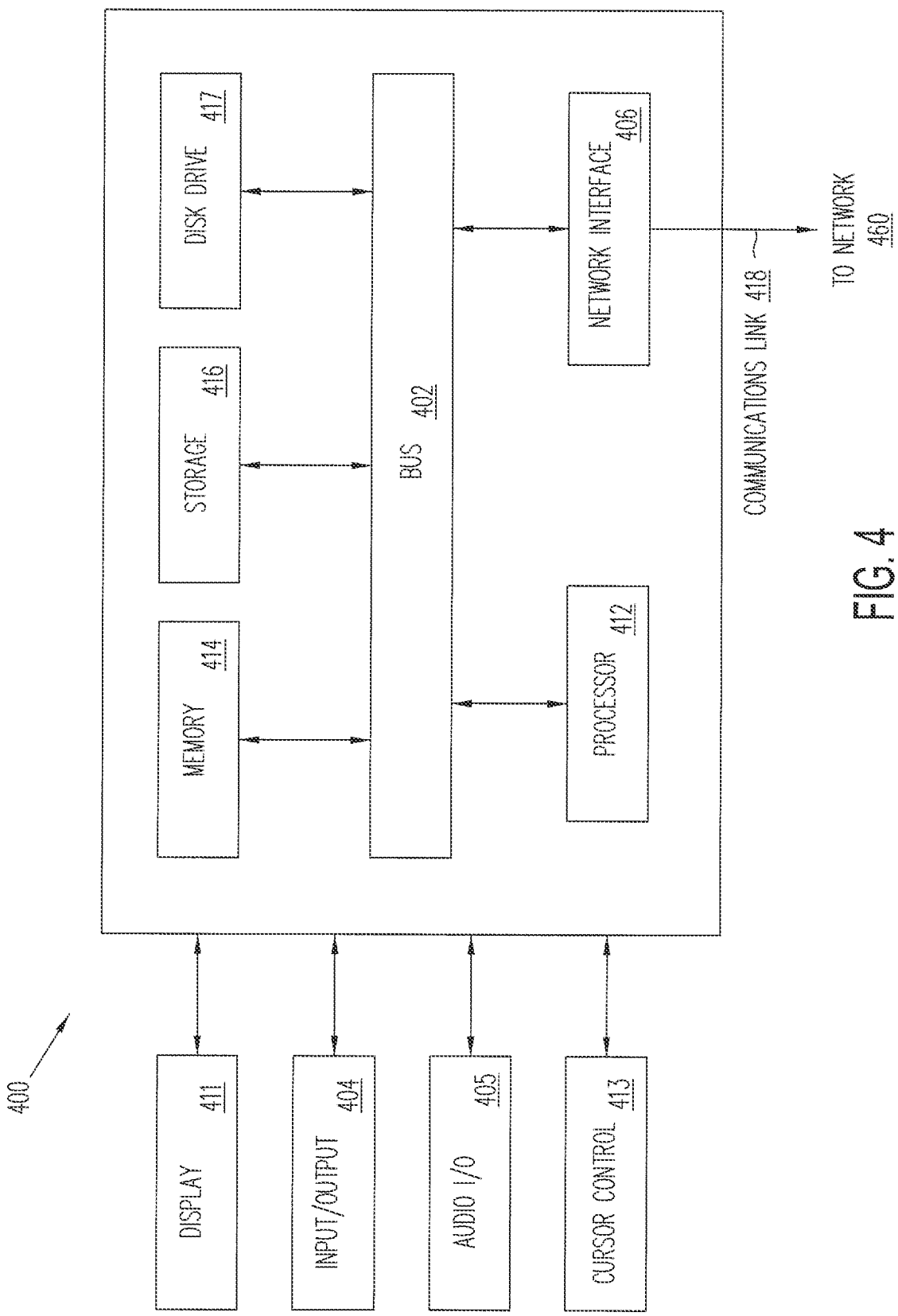
FIG. 4 is a block diagram of a computer system suitable for implementing one or more components in FIG. 1 according to one embodiment.

FIG. 4 is a block diagram of a computer system 400 suitable for implementing one 30 or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another. Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

The one or more memories and one or more hardware processors can be part of the same device, e.g., server. The one or more memories and one or more hardware processors can be part of the different devices, e.g., servers. The one or more memories and one or more hardware processors can be co-located. The one or more memories and one or more hardware processors can be located in different places, e.g., different rooms, different buildings, different cities, or different states.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise.

As used herein, the term "product" can include any item or service. Thus, the term "product" can refer to physical products, digital goods, services, or anything for which a user can make a payment, including charitable donations. A product can be anything that can be sold. Examples of products include cellular telephones, concerts, meals, hotel rooms, automotive repair, haircuts, digital music, and books. The product can be a single item or a plurality of items.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

As used herein, the term "network" can include one or more local area networks (LANs) such as business networks, one or more wide area networks (WANs) such as the Internet, one or more cellular telephone networks, or any other type or combination of electronic or optical networks.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A method comprising:
    displaying, on a touchscreen of a computing device, an icon in a user interface;
    detecting a first input to the touchscreen of the computing device, the first input comprising a hold input to select the icon displayed in the user interface, the hold input being received when a finger of a user makes contact with the touchscreen of the computing device for an expected amount of time;
    in response to detecting the first input to select the icon, displaying multiple actions associated with the selected icon in the user interface, wherein the multiple actions are not displayed prior to detecting the first input, and wherein the multiple actions are simultaneously displayed in the user interface in response to detecting the first input to select the icon;
    receiving a second input to the touchscreen of the computing device after the finger of the user is lifted from the touchscreen, the second input comprising a tap input at a position of an action of the multiple actions to select the action, the tap input being received when the finger of the user makes contact with the touchscreen of the computing device at the position of the action; and
    in response to detecting the second input, initiating the selected action.

2. The method of claim 1, wherein the computing device comprises a smart phone.

3. The method of claim 2, wherein the user interface is displayed on the touchscreen of the smart phone.

4. The method of claim 1, wherein the tap input is received after the finger is lifted from the touchscreen.

5. The method of claim 1, wherein the computing device comprises a tablet device.

6. The method of claim 5, wherein the user interface is displayed on the touchscreen of the tablet device.

7. The method of claim 1, wherein the finger of the user makes contact with the touchscreen at a position on the touchscreen at which the icon is displayed.

8. A mobile computing device comprising:
    a touchscreen; and
    at least a memory and a processor to perform operations comprising:
        displaying, by the touchscreen, an icon in a user interface;
        detecting a first input to the touchscreen, the first input comprising a hold input to select the icon displayed in the user interface, the hold input being received when a finger of a user makes contact with the touchscreen for an expected amount of time;
        in response to detecting the first input to select the icon, displaying multiple actions associated with the selected icon in the user interface, wherein the multiple actions are not displayed prior to detecting the first input, and wherein the multiple actions are simultaneously displayed in the user interface in response to detecting the first input to select the icon;
        receiving a second input to the touchscreen of the computing device after the finger of the user is lifted from the touchscreen, the second input comprising a tap input at a position of an action of the multiple actions to select the action, the tap input being received when the finger of the user makes contact with the touchscreen of the computing device at the position of the action; and in response to detecting the second input, initiating the selected action.

9. The mobile computing device of claim 8, wherein the tap input is received after the finger is lifted from the touchscreen.

10. The mobile computing device of claim 8, wherein the mobile computing device comprises a smart phone.

11. The mobile computing device of claim 10, wherein the user interface is displayed on the touchscreen of the smart phone.

12. The mobile computing device of claim 8, wherein the mobile computing device comprises a tablet device.

13. The mobile computing device of claim 8, wherein the finger of the user makes contact with the touchscreen at a position on the touchscreen at which the icon is displayed.

14. One or more non-transitory computer-readable storage devices comprising instructions stored thereon that, responsible to execution by at least one processor of a computing device, performs operations comprising:

displaying, on a touchscreen of the computing device, an icon in a user interface;

detecting a first input to the touchscreen of the computing device, the first input comprising a hold input to select the icon displayed in the user interface, the hold input being received when a finger of a user makes contact with the touchscreen of the computing device for an expected amount of time;

in response to detecting the first input to select the icon, displaying multiple actions associated with the selected icon in the user interface, wherein the multiple actions are not displayed prior to detecting the first input, and wherein the multiple actions are simultaneously displayed in the user interface in response to detecting the first input to select the icon;

receiving a second input to the touchscreen of the computing device after the finger of the user is lifted from the touchscreen, the second input comprising a tap input at a position of an action of the multiple actions to select the action, the tap input being received when the finger of the user makes contact with the touchscreen of the computing device at the position of the action; and in response to detecting the second input, initiating the selected action.

15. The one or more non-transitory computer-readable storage devices of claim 14, wherein the computing device comprises a smart phone.

16. The one or more non-transitory computer-readable storage devices of claim 15, wherein the user interface is displayed on the touchscreen of the smart phone.

17. The one or more non-transitory computer-readable storage devices of claim 14, wherein the tap input is received after the finger is lifted from the touchscreen.

18. The one or more non-transitory computer-readable storage devices of claim 14, wherein the computing device comprises a tablet device.

19. The one or more non-transitory computer-readable storage devices of claim 18, wherein the user interface is displayed on the touchscreen of the tablet device.

20. The one or more non-transitory computer-readable storage devices of claim 14, wherein the finger of the user makes contact with the touchscreen at a position on the touchscreen at which the icon is displayed.

\* \* \* \* \*